United States Patent [19]

Greene

[11] 4,227,567
[45] * Oct. 14, 1980

[54] INTERMEDIATE TEMPERATURE, HEAT STORAGE AND RETRIEVAL SYSTEM

[75] Inventor: Norman D. Greene, Del Mar, Calif.

[73] Assignee: Kohler Co., Kohler, Wis.

[ * ] Notice: The portion of the term of this patent subsequent to Aug. 29, 1995, has been disclaimed.

[21] Appl. No.: 971,869

[22] Filed: Dec. 21, 1978

[51] Int. Cl.³ .............................................. F28D 21/00
[52] U.S. Cl. ......................................... 165/1; 252/70; 165/104 S
[58] Field of Search ................. 165/104 S, 1; 126/400; 252/70

[56] References Cited

U.S. PATENT DOCUMENTS

| | | | |
|---|---|---|---|
| 2,996,894 | 8/1961 | Shade | 165/104 S X |
| 3,952,519 | 4/1976 | Watson | 252/70 X |
| 4,109,702 | 8/1978 | Greene | 165/104 S X |

*Primary Examiner*—Albert W. Davis
*Attorney, Agent, or Firm*—William W. Haefliger

[57] ABSTRACT

Energy is stored by heating a salt to a temperature above its latent heat of fusion to convert the salt to a liquid state. Heat is retrieved by moving a heat transfer fluid that is immiscible with the salt and has a density less than that of the salt over the top surface of the liquid salt at such a velocity that the upper layer of the salt is emulsified with the heat transfer fluid to crystallize the salt in the upper layer. Heat is thereby exothermally surrendered to the heat transfer fluid and the crystallized salt gravitates from said top surface, thereby maintaining the top surface in a liquid state. It is preferred to move the heat transfer fluid over the top surface of the salt in either a vortex pattern, or an outward radial pattern. The heat transfer liquid is a liquid selected from the group consisting essentially of THERMINOL, CALORIA, SANTOWAX, and dibutyl phthalate.

18 Claims, 4 Drawing Figures

INTERMEDIATE TEMPERATURE, HEAT STORAGE AND RETRIEVAL SYSTEM

BACKGROUND OF THE INVENTION

This application is related to my earlier application Ser. No. 712,353, filed Aug. 6, 1976.

The present invention generally pertains to the storage of energy and the retrieval thereof as heat, and is specifically directed to physical-chemical methods and systems for storing and retrieving heat.

There is a need for an improvement in storing energy. Most forms of energy are readily converted to heat and may be stored by heating a storage medium. The storage medium may be an inert substance, such as water or rocks, wherein the heat is stored by raising the temperature of the substance and retrieved by moving a relatively cooler heat transfer fluid over the surface of the storage medium. Heat storage by raising the temperature of chemically inert material has the disadvantage of requiring thermal insulation to prevent heat loss and requiring a large volume of substance to store useful quantities of heat.

Heat also may be stored by reversibly physiochemical reactions. In one such system, a salt hydrate is heated in a container to above its latent heat of fusion to its liquid state to store the heat. The heat is retrieved by passing a relatively cooler heat transfer fluid such as air or water around the salt hydrate container, thereby producing an exothermic crystallization process, whereby heat is surrendered to the heat transfer fluid. One difficulty with this system is that a stratification layer of the crystalized salt tends to form at the heat transfer surface thereby creating a barrier which reduces the rate of heat transfer.

SUMMARY OF THE INVENTION

According to the present invention, energy is stored by heating a salt to a temperature above its latent heat of fusion to convert the salt to a liquid state; and heat is retrieved by moving a heat transfer fluid that is immiscible with (and non-chemically reactive with) the salt, and has a density less than that of the salt, over the top surface of the liquid salt at such a velocity that the upper layer of the salt is emulsified with the heat transfer fluid to crystalize the salt in the upper layer to thereby exothermally surrender heat from the salt to the heat transfer fluid. The crystalized salt gravitates from the top surface thereby maintaining the top surface in a liquid state. As will be seen, the heat transfer fluid is selected from the group that consists essentially of THERMINOL, CALORIA, SANTOWAX, and dibutyl phthalate; and the salt is selected from the group that consists essentially of potassium hydroxide, sodium hydroxide and sodium nitrate.

By using a heat transfer fluid that is immiscible with the salt and of a lower density than the salt, an emulsion between the two can be formed to thereby increase the heat transfer area; while at the same time a sufficient demarcation between the heat transfer fluid and the salt is defined to prevent significant entrainment of salt crystals in the heat transfer fluid outside of the emulsion layer. A higher heat transfer rate is obtained because of the larger heat transfer area between the salt and the heat tranfer fluid incident to their direct contact with one another in the emulsion.

The heat transfer fluid is moved across the salt in such a pattern as to create a large shear rate between them. Two preferred patterns are a vortex pattern and an outward radial pattern. Although the heat transfer fluid is moved across the top surface of the salt at such a velocity that the upper layer of the liquid salt is emulsified with the heat transfer fluid to increase the heat transfer area this velocity must not be so high that crystallized salt is entrained in the heat transfer fluid outside of the emulsion layer. If the salt crystals become so entrained they may coat and clog water means, if any, are used to move the heat transfer fluid out of the container containing the salt to a heat exchanger.

In one embodiment both the heat transfer fluid and the salt are enclosed in the same container and a coolant is moved through tubing that makes contact with the heat transfer fluid to remove heat from the heat transfer fluid through the tubing to the coolant. Because the heat transfer fluid is enclosed in the container, a larger emulsion layer can be tolerated since there is no danger of salt crystals being circulated outside of the container; and as a result a greater heat transfer area and crystalization rate can be achieved.

DRAWING DESCRIPTION

DETAILED DESCRIPTION

Figure 1:
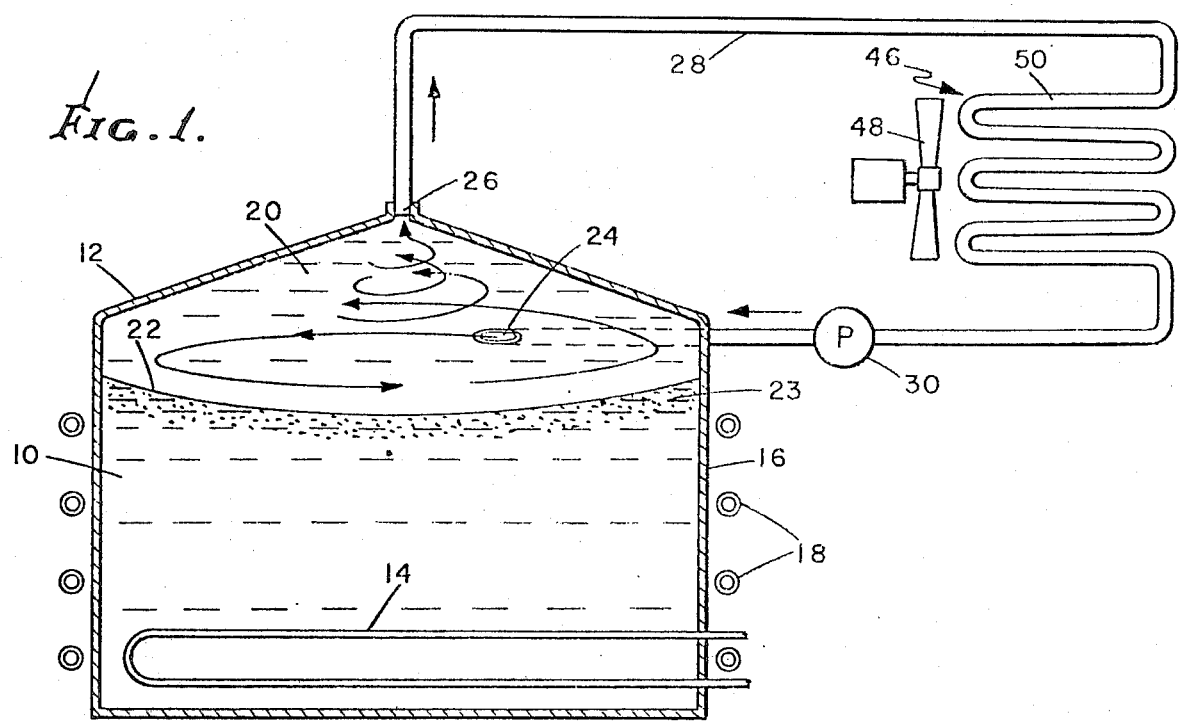
FIG. 1 is a schematic drawing of one preferred embodiment of an energy storage and heat retrieval system in accordance with the present invention.

Referring to FIG. 1, the salt 10 is stored in a cylindrical container 12. The salt is heated by energy transferred through a heating coil 14 inside the container 12 and/or by energy transferrred through the container wall 16 from hot water tubes 18 mounted on the ouside wall 16 of the container 12. Accordingly, the salt 10 is heated to above its latent heat of fusion to its liquid state (phase). Conductive heating strips can be substituted for the hot water tubes in a system wherein all of the energy to be stored is electrical in from. Alternatively, where all of the energy is stored form hot water, hot water tubes can be substituted for the heating coil 14.

The heat transfer liquid 20 is moved rapidly over the top surface 22 of the salt 10 in a vortex pattern, and an emulsion layer 23 is formed. The salt in the emulsion layer 23 crystalizes and exothermally transfers to the liquid 20 the energy that was stored in the salt 10 by heating the salt 10 to above its latent heat of fusion. The salt which crystalizes then gravitates to the bottom of the container 12 to maintain the top surface 22 of the salt 10 in a liquid state.

This process of rapidly moving the heat transfer liquid 20 directly across the top surface of the salt 10 is also significant when the salt is one which both has a supercooled phase and can be converted from its supercooled phase by agitation. The agitation produced by the rapid movement of the heat transfer fluid causes such a salt to crystalize from its supercooled phase when the mere cooling of the salt 10 by contact with a relatively cooler heat transfer fluid by itself would not be sufficient to convert the salt 10 from its supercooled liquid state, and the introduction of a nucleation agent to effect such conversion would be necessary. The present invention is nevertheless operable, however, even with those salts having a supercooled state, as to which agitation does not effect conversion, whereby the introduction of a nucleation agent or some other means is required for conversion.

The top of the container 12 has an inlet 24 through which the liquid 20 is directed tangentially into the container 12 so as to flow in a free vortex pattern. The liquid 20 is moved over the top surface 22 of the salt 10 at such a velocity that the upper layer of the salt 10 is emulsified with the liquid 20 in a layer 23 to increase the heat transfer area. The top of the container 12 includes an oulet 26 in its top center for drawing out the liquid 20. The liquid 20 flows more rapidly at the center of the vortex and thereby affords a higher heat transfer rate near the outlet 26. Also, intense centrifugal force near the center of the vortex separates any salt crystals from the liquid 20 and prevents such salt crystals from being drawn into the outlet 26, and thereby prevents the outlet 26 and the tubing 28 leading therefrom from becoming coated with and clogged by any such salt crystals.

The heated liquid 20 is transferred by tubing 28 to a heat exchanger 46. The heat 46 essentially includes a coil 50 and a fan 48 for removing the heat from the liquid by blowing air across the coil 50. A pump 30 is provided in the system for pumping the cooled liquid back through the container 12.

This process may be repeated by again heating the crystalized salt to a temperature above its latent heat of fusion.

Figure 2:
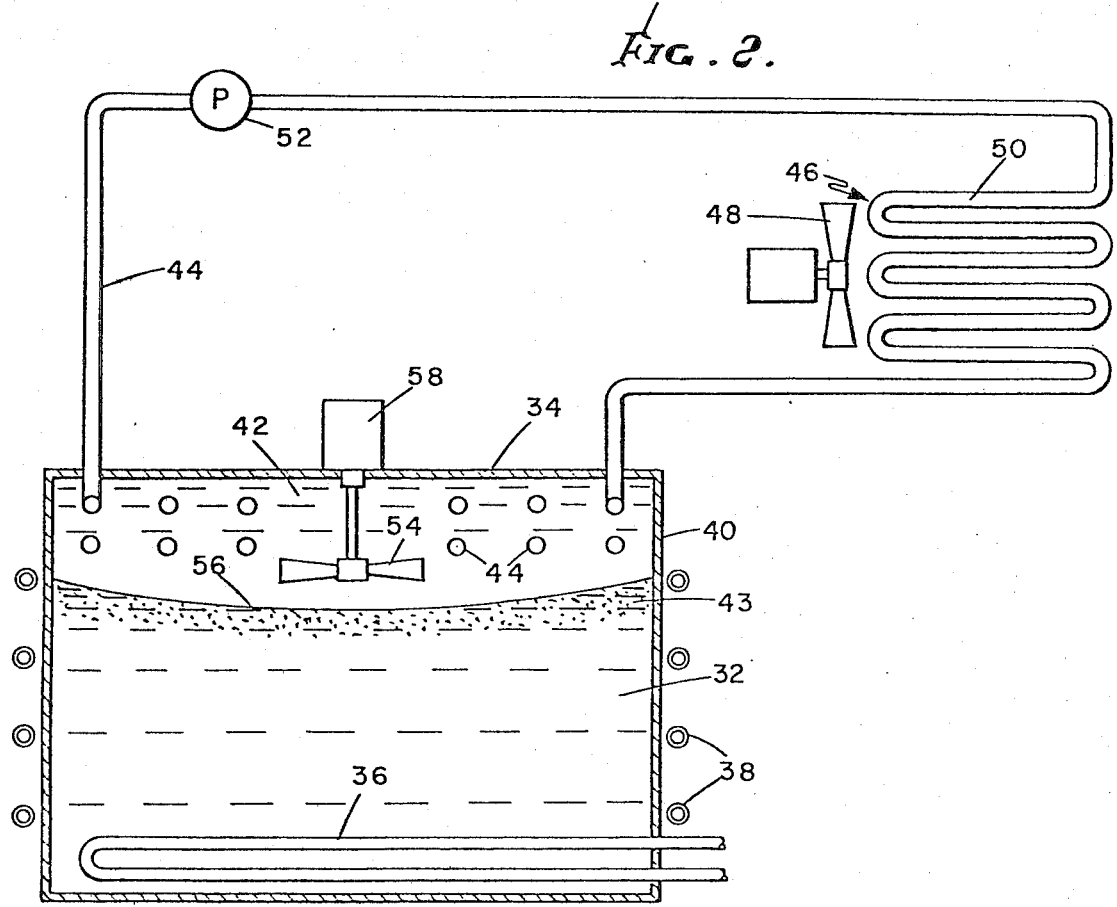
FIG. 2 is a schematic drawing of a second preferred embodiment of the system of the present invention.

Referring to FIG. 2, the salt 32 is stored in a cylindrical container 34. A heating coil 36 inside the container 34 and hot water tubes 38 mounted on the outside of the container wall 40 are provided for heating the salt 32 to store energy therein as described in connection with the embodiment shown in FIG. 1 discussed hereinabove.

The heat transfer liquid 42 (which is the primary heat transfer fluid) is stored within the container 34 in the space above the salt 32. A coolant (which is in effect, a secondary heat transfer fluid) is circulated through the liquid 42 without making direct contact therewith by means of tubing 44. The heated coolant is moved through the tubing 44 to a heat exchanger 46 where heat is removed from the coolant by blowing air with a fan 48 across a coil 50. A pump 52 is provided for circulating the coolant.

Still referring to the embodiment of FIG. 2, a propeller 54 is mounted in the top center of the container 34 for moving the liquid 42 over the top surface 56 of the salt 32 in an outward radial pattern. The outward radial pattern of the flow of the liquid maintains high temperatures at the wall 40 of the container 34 and thereby prevents salt crystals from building up on the wall 40. Any salt crystals having a tendency to form on the wall 40 or the tubing 44 will melt when heated. The propeller 54 is driven by a motor 58.

The liquid 42 is moved over the top surface of the salt 32 to form an emulsion with the salt in layer 43. The liquid 42 is heated by the exothermic crystallization of the salt 32 and the salt crystals so formed gravitate to the bottom of the container 34 to maintain the top surface 56 in a liquid state. This process may be repeated by again heating the crystalized salt to above its latent heat of fusion. The heat transfer area may be increased by increasing the size of the emulsion layer 43. Because the liquid 42 is enclosed in the container 34, a larger emulsion layer can be tolerated than in the embodiment shown in FIG. 1.

Figure 3:
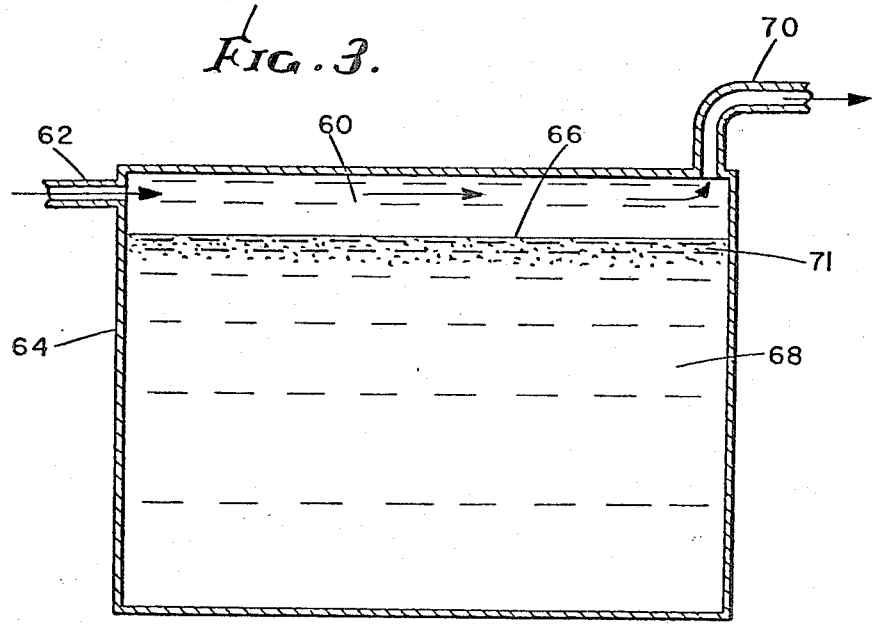
FIG. 3 is a schematic drawing showing a portion of another preferred embodiment of the system of the present invention.
Figure 4:
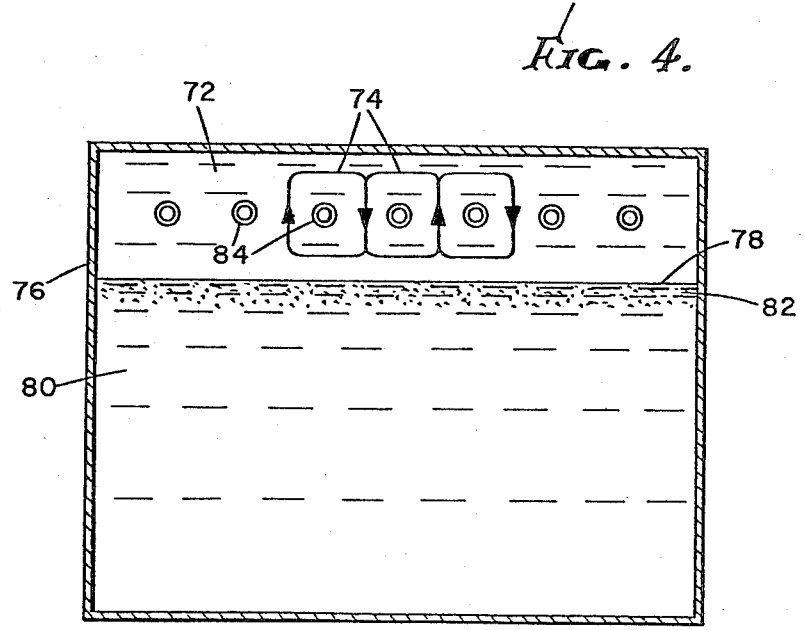
FIG. 4 is a schematic drawing of a portion of still another preferred embodiment of the system of the present invention.

The present invention may also be practiced by linear movement of the heat transfer liquid over the top surface of the liquid state salt, such as with the systems partially shown in FIGS. 3 and 4.

In the system of FIG. 3, the heat transfer liquid 60 is moved from an inlet 62 on one side of the container 64 across the top surface 66 of the liquid salt 68 to an outlet 70 on the other side of the container 64. In other respects, this embodiment is the same as that shown in FIG. 1. An extremely high rate of linear flow is desired in order to create an emulsion in the top layer 71 of the salt 68 with the liquid 60 to increase the heat transfer area. Also, with a higher rate of flow the salt crystals that are formed are of smaller size, thereby providing greater heat release and also preventing an accumulation of salt crystals at the top surface 66.

In the system of FIG. 4 the heat transfer liquid 72 is moved within convection cells 74 formed in the top portion of the container 76, thereby creating a linear motion across the top surface 78 of the salt 80 to form an emulsion layer 82. A coolant that circulates through a heat exchanger (not shown) is moved through the liquid 72 without making contact therewith by means of tubing 84, as in the embodiment shown in FIG. 2. The heat flows in free convection currents through the liquid 72 within the container 76 and is conducted to the coolant through the tubing 84.

The process of storing energy by heating the salt and retrieving the energy by exothermic crystallization of the salt caused by moving the relatively cooler heat transfer liquid across the salt is the same in the embodiments of FIGS. 3 and 4 as in the embodiments of FIGS. 1 and 2.

In all of the above embodiments, the heat transfer liquid is selected from the group that includes:
  (a) THERMINOL 55, a product of Monsanto Company
  (b) THERMINOL 66, a product of Monsanto Company
  (c) THERMINOL 88, a product of Monsanto Company
  (d) CALORIA, a product of MMM Company
  (e) SANTOWAX, a product of Monsanto Company
  (f) di-butyl phthalate These may be considered as oils, with THERMINOL 55 having a vapor pressure of $\frac{1}{2}$ to $\frac{1}{3}$ atmosphere at 550° F., THERMINOL 66 having the same vapor pressure at 660° F. and THERMINOL 88 the same at 880° F.

Also, in all of the above embodiments, the salt is selected from the group that includes:
  (g) potassium hydroxide (with a melting point around 360.4° C.)
  (h) sodium hydroxide (with a melting point around 318° C.)
  (i) sodium nitrate (with a melting point around 306.8° C.)

EXAMPLE 1

The system of FIG. 1 was operated, employing THERMINOL 66 as the additive liquid, and potassium hydroxide as the salt. Good heat transfer results were achieved at an operating temperature of around 318° C.

EXAMPLE 2

The system of FIG. 1 was operated using THERMINOL 66 as the additive liquid, and sodium hydroxide as the salt. Again, good heat transfer results were achieved at an operating temperature of around 318° C.

I claim:

1. The method of storing energy and retrieving such stored energy as heat, that includes
   (a) providing a liquid system that consists essentially of a salt melt lower region, an upper region of additive liquid which is immiscible with the salt melt, said liquid selected from the group which consists essentially of THERMINOL, CALORIA, SANTOWAX, and di-butyl phthalate, and an emulsion of said melt and additive liquid intermediate said upper and lower regions,
   (b) effecting latent heat transfer from the melt to the additive liquid within the emulsion, and transferring heat from the additive liquid,
   (c) maintaining active flowing movement of the emulsion to enhance said latent heat transfer, and which results in formation of salt crystals, and
   (d) gravitating said crystals downwardly in the melt away from the emulsion.

2. The method of claim 1 wherein said THERMINOL is selected from the group that consists of THERMINOL 55, THERMINOL 66, and THERMINOL 88.

3. The method of claim 1 wherein the salt is selected from the group consisting essentially of potassium hydroxide, sodium hydroxide and sodium nitrate.

4. The method of claim 1 wherein said (c) step is carried out under turbulent flow conditions in the emulsion, but which allow said step (d) crystal gravitation.

5. The method of claim 4 wherein an agitator is provided to project into the system, and including the step of operating the agitator to effect formation of the emulsion.

6. The method of claim 1 wherein said (c) step is carried out to form vortex means in the system liquid.

7. The method of claim 1 wherein said (a) step includes transferring heat into the salt to form the melt.

8. The method of claim 7 wherein said transfer of heat into the salt includes flowing hot fluid into heat transfer relation with the salt crystals.

9. The method of claim 1 wherein said heat transfer from the additive liquid is effected by flowing the additive liquid through a heat exchanger remote from the melt.

10. The method of claim 1 wherein said heat transfer from the additive liquid is effected by flowing a heat transfer fluid in heat transfer proximity with the additive liquid, above the emulsion layer.

11. A system for storing energy and retrieving said stored energy as heat, comprising
   (a) a container,
   (b) a liquid system in the container, including
      (i) a salt melt lower region,
      (ii) an upper region of additive liquid which is immiscible with the salt melt, said liquid selected from the group which consists essentially of THERMINOL, CALORIA, SANTOWAX, and di-butyl phthalate, and
      (iii) an emulsion of said melt and additive liquid located intermediate the upper and lower regions,
   (c) means for transferring heat from the additive liquid,
   (d) means to form and maintain the emulsion in an actively moving state to enhance latent heat transfer from the melt to the additive liquid within the emulsion, which results in formation of salt crystals,
   (e) there being a zone below said emulsion to which said crystals gravitate, and there being means to transfer heat to the crystals in said zone.

12. The system of claim 11 wherein said THERMINOL is selected from the group that consists of THERMINOL 55, THERMINOL 66 and THERMINOL 88.

13. The system of claim 11 wherein the salt is selected from the group that consists essentially of potassium hydroxide, sodium hydroxide and sodium nitrate.

14. The system of claim 11 including means communicating with the interior of the container for effecting said actively moving state of the emulsion under turbulent flow conditions, but which allows said gravitation of the crystals.

15. The system of claim 14 wherein said means for effecting said actively moving state of the emulsion layer includes a rotating rotor, and said emulsion layer forms vortex means in response to rotor rotation.

16. The system of claim 11 wherein said means to transfer heat to the crystals includes ducting containing flowing hot fluid.

17. The system of claim 11 wherein said means for transferring heat from the additive liquid includes a heat exchanger remote from the melt, and ducting communicating with said additive in the container and with said heat exchanger for circulating the additive liquid therebetween.

18. The system of claim 11 wherein said means for transferring heat from the additive liquid includes ducting flowing an auxiliary fluid in heat receiving relation with the additive liquid.

* * * * *